(12) United States Patent
Chen

(10) Patent No.: US 10,819,885 B2
(45) Date of Patent: Oct. 27, 2020

(54) GAMMA VALUE TUNING METHOD AND DEVICE OF DISPLAY PANEL

(71) Applicants: CHONGQING ADVANCE DISPLAY TECHNOLOGY RESEARCH, Chongqing (CN); Chongqing HKC Optoelectronics Technology Co., Ltd., Chongqing (CN)

(72) Inventor: Wei Chen, Chongqing (CN)

(73) Assignees: CHONGQING ADVANCE DISPLAY TECHNOLOGY RESEARCH, Chongqing (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/451,057

(22) Filed: Jun. 25, 2019

(65) Prior Publication Data
US 2020/0154003 A1 May 14, 2020

Related U.S. Application Data

(63) Continuation of application No. PCT/CN2018/118902, filed on Dec. 3, 2018.

(30) Foreign Application Priority Data

Nov. 9, 2018 (CN) .......................... 2018 1 1336116

(51) Int. Cl.
*H04N 5/202* (2006.01)
*G09G 3/34* (2006.01)
*H04N 9/69* (2006.01)

(52) U.S. Cl.
CPC .......... *H04N 5/202* (2013.01); *G09G 3/3413* (2013.01); *H04N 9/69* (2013.01); *G09G 2320/0276* (2013.01); *G09G 2320/0673* (2013.01)

(58) Field of Classification Search
CPC ................ H04N 5/202; G09G 3/3413; G09G 2320/0276; G09G 2320/0673
See application file for complete search history.

(56) References Cited

U.S. PATENT DOCUMENTS

| 6,593,934 B1* | 7/2003 | Liaw | G09G 3/2092 345/590 |
| 7,102,696 B2* | 9/2006 | Kao | H04N 5/202 345/590 |

(Continued)

FOREIGN PATENT DOCUMENTS

| CN | 103325357 A | 9/2013 |
| CN | 103761945 A | 4/2014 |

(Continued)

*Primary Examiner* — Brian P Yenke

(57) ABSTRACT

Disclosed are a gamma value tuning method of a display panel, which comprises the following steps: setting a preset gamma value interval according to a parameters of a display panel to be tested; acquiring a brightness value of a gray scale on the display panel to be tested; calculating a gamma value corresponding to the brightness value of the gray scale; adjusting the gamma value to the first gamma value when the gamma value is smaller than the first gamma value of the preset gamma value interval; adjusting the gamma value to the second gamma, when the second gamma value in the gamma value is larger than the preset gamma value interval.

18 Claims, 7 Drawing Sheets

(56) References Cited

U.S. PATENT DOCUMENTS

| | | | |
|---|---|---|---|
| 7,403,181 B2* | 7/2008 | Moon | G09G 3/3648 345/87 |
| 7,746,364 B2* | 6/2010 | Shen | G09G 3/006 345/690 |
| 8,605,121 B2* | 12/2013 | Chu | G09G 3/3648 34/254 |
| 8,773,451 B2* | 7/2014 | Marcu | G09G 3/006 345/101 |
| 8,994,762 B2* | 3/2015 | Kim | G09G 3/3233 345/690 |
| 9,253,374 B2* | 2/2016 | Kobayashi | H04N 5/202 |
| 9,390,678 B2* | 7/2016 | Yang | H04N 9/69 |
| 10,186,226 B2* | 1/2019 | Seo | G09G 3/3275 |
| 10,346,711 B2* | 7/2019 | Itou | G09G 5/028 |
| 10,360,847 B2* | 7/2019 | Lee | G09G 3/3233 |
| 10,395,597 B2* | 8/2019 | Yang | G09G 3/00 |
| 10,446,095 B2* | 10/2019 | Zhao | G09G 3/3607 |
| 10,460,655 B2* | 10/2019 | Zhang | G09G 3/3225 |
| 10,531,080 B2* | 1/2020 | Lee | G09G 3/006 |
| 2003/0006952 A1 | 1/2003 | Hong | |
| 2006/0280360 A1* | 12/2006 | Holub | G03B 27/547 382/162 |
| 2009/0219306 A1* | 9/2009 | Oh | G09G 3/3225 345/690 |
| 2011/0109661 A1* | 5/2011 | Lee | G09G 3/20 345/690 |
| 2012/0032995 A1* | 2/2012 | Lee | G09G 3/3233 345/690 |
| 2012/0062609 A1* | 3/2012 | Jeon | G09G 3/3208 345/690 |
| 2016/0005348 A1 | 1/2016 | Yanagi | |
| 2016/0050402 A1* | 2/2016 | Jeong | H04N 9/69 348/674 |
| 2017/0053586 A1* | 2/2017 | Chen | G09G 3/2074 |
| 2019/0005901 A1* | 1/2019 | Chen | G09G 3/2003 |

FOREIGN PATENT DOCUMENTS

| | | |
|---|---|---|
| CN | 103928006 A | 7/2014 |
| CN | 104361871 A | 2/2015 |
| CN | 106971695 A | 7/2017 |
| CN | 107045863 A | 8/2017 |
| CN | 107578760 A | 1/2018 |
| CN | 108492772 A | 9/2018 |
| JP | 2014147001 A | 8/2014 |

* cited by examiner

US 10,819,885 B2

GAMMA VALUE TUNING METHOD AND DEVICE OF DISPLAY PANEL

CROSS REFERENCE

The present application is a Continuation Application of PCT Application No. PCT/CN2018/118902 filed on Dec. 3, 2018, which claims benefit of Chinese Patent Application No. 201811336116.7, filed with the Chinese Patent Office, Nov. 9, 2018 and entitled "gamma value tuning method and device of display panel", which is incorporated herein by reference in its entirety.

TECHNICAL FIELD

The present application relates to the technical field of electronic circuit, in particular, to a gamma value tuning method and device of a display panel.

BACKGROUND

In the production process of Thin Film Transistor Liquid Crystal Display (TFT-LCD), the Gamma curve of each TFT-LCD panel will deviate due to the differences in manufacturing and materials. If the Gamma curve is adjusted by manual patches on the production line, the overall labor and time costs will be greatly increased, so the Gamma curve adjustment is now mostly realized by an automated gamma value adjustment system.

At present, most automated gamma value adjustment systems take gamma value 2.2 as the target value, and then adjust gammas on each gray scale based on this value. However, when the difference is large before and after gamma value adjustment, the white balance at the adjusted gamma binding point will be reversed.

SUMMARY

The main purpose of the present application is to provide a gamma value tuning method and device of a display panel, aiming to solve the problem that when the difference is too large between the gamma value corresponding to the gray scale and the target gamma, a color shift will occur on the display panel, resulting in a white balance reversal.

In order to achieve the aforementioned objective, the present application provides a gamma value tuning method of a display panel, which includes the following steps:

setting a preset gamma value interval according to a parameter of the display panel to be tested;

acquiring a brightness value of a gray scale on the display panel to be tested;

calculating a gamma value corresponding to the brightness value of the gray scale;

adjusting the gamma value to a first gamma value when the gamma value is less than the first gamma value of the preset gamma value interval;

adjusting the gamma value to a second gamma value when the second gamma value in the gamma value is larger than the preset gamma value interval.

The present application also provides a gamma value tuning device of a display panel, which includes a light sensor configured to acquire the brightness value of the gray scale on the display panel to be tested;

a processor, configured to run a gamma value tuning program;

a memory, configured to store a gamma value tuning program executable on the processor; in which, the light sensor is electrically connected to the processor, and a step of the gamma value tuning method aforementioned is implemented, when the gamma value tuning program is executed by the processor.

The present application further provides a gamma value tuning method for a display panel, which includes the following steps:

setting a plurality of preset gamma value intervals according to a parameter of the display panel to be tested;

acquiring brightness values of gray scales on the display panel to be tested;

calculating a gamma value corresponding to the brightness value of the gray scale;

matching the gamma value with the plurality of preset gamma value intervals;

adjusting the gamma value to a target gamma value of a corresponding preset gamma value interval, when the gamma value is determined in the corresponding preset gamma value interval among the plurality of preset gamma value intervals.

The present application further provides a computer-readable storage medium having stored thereon a gamma value tuning program which, when executed by a processor, implements the steps of the gamma value tuning method of the display panel as described above.

The gamma value tuning method of the display panel of the present application calculates the gamma value of the gray scale after acquiring the brightness value of the gray scale on the display panel to be tested; and then the gamma value corresponding to the gray scale is adjusted to the first gamma value when the first gamma value is determined to be smaller than the preset gamma value interval among the gammas. Or when the second gamma value is determined to be larger than the preset gamma value interval in the gamma, the gamma value corresponding to the gray scale is adjusted to the second gamma. Given that the gamma value of the gray scale meets the requirements of human eyes on the linear relationship between brightness change and gray scale change, the difference between the gamma value corresponding to the gray scale and the target gamma value is reduced. The present application solves the problem of the color shift and the white balance reversal when the difference between the gamma value corresponding to the gray scale and the target gamma value is too large during the adjustment of the gamma, thereby improving the display picture quality of the display panel.

BRIEF DESCRIPTION OF THE ACCOMPANYING DRAWINGS

In order to explain the embodiments of the present application or the technical solutions in the prior art more clearly, the drawings used in the embodiments or the description of the prior art will be briefly introduced below. Obviously, the drawings in the following description are only some embodiments of the present application. For those skilled in the art, some other drawings can be obtained according to the structures shown in these drawings without paying creative effort.

Figure 1:
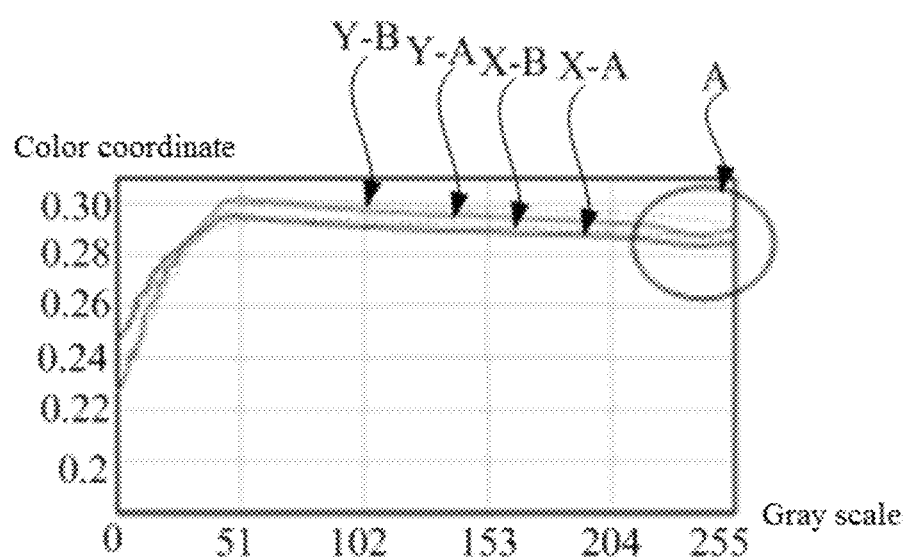
FIG. 1 is an exemplary curve of the relationship between the color coordinate and the gray scale.

The implementation, functional features and advantages of the purpose of the present application will be further described with reference to the accompanying drawings in conjunction with the embodiments.

DETAILED DESCRIPTION OF ILLUSTRATIVE EMBODIMENTS

The technical solution in the embodiment of the present application will be described clearly and completely in the following with reference to the drawings in the embodiment of the present application. Obviously, the described embodiment is only a part of the embodiment of the present application, but not all of the embodiments. Based on the embodiments in the present application, all other embodiments obtained by a person of ordinary skill in the art without creative effort are within the protection scope of the present application.

It should be noted that if directional indications (such as up, down, left, right, front, back, etc.) are involved in the embodiments of the present application, the directional indications are only used to explain the relative positional relationship and movement between the components in a certain posture (as shown in the drawings), and if the specific posture changes, the directional indications will change accordingly.

In addition, if there are descriptions of "first" and "second" in the embodiments of this application, the descriptions of "first" and "second" are used for descriptive purposes only and cannot be understood as indicating or implying their relative importance or implicitly indicating the number of indicated technical features. Thus, features defining "first" and "second" may explicitly or implicitly include at least one such feature. In addition, the technical solutions between the various embodiments may be combined with each other, but must be based on what one of ordinary skill in the art can achieve. When the combination of technical solutions is contradictory or impossible to achieve, it should be considered that the combination of such technical solutions does not exist and is not within the protection scope required by the present application.

The present application provides a gamma value tuning method for a display panel.

In some embodiments, the display panel can be applied to a liquid crystal display device with a liquid crystal panel such as computer display screens, cell phones, monitors, televisions, etc.

During the production and manufacture of the display panel, since the red, green and blue photoelectric characteristics of the LCD screen are not consistent, the color difference of each gray scale is large, and the color of each gray scale needs to be corrected. In particular, the gray scale error of the dark field is very obvious. Only after the colors of each gray scale are consistent, the color temperature can be adjusted to the required color temperature by white balance adjustment of the bright and dark field. On the other hand, the brightness of the LCD TV display is relatively high. In order to increase the transparent brightness of the LCD TV display and better represent colors, it is necessary to perform nonlinear correction on the brightness of the LCD TV display. All this needs to be done by gamma value correction of the LCD TV display. At present, most of the tuning methods for gamma value take 2.2 as the target value to correct the deviation of gamma value. In the process of adjusting the gamma, when the gamma value is increased, it shows that the overall brightness is raised, the original dark part occupies more bright and dark ranges and is easy to distinguish details. The original bright part becomes brighter and details are difficult to distinguish. When the gamma value is reduced, it appears as overall darkening, the original bright part occupies more bright and dark ranges and is easy to distinguish details. The original dark part becomes darker and it becomes difficult to distinguish details. In addition, when the gamma value is adjusted and the difference between the gamma value corresponding to the gray scale and the target gamma value is large, the change trend of the red, green and blue three-color Gamma curve may be inconsistent. For example, in a certain gray scale, the change rule of a certain color in the three colors suddenly changes greatly, and the Gamma curve is deflected and deviates from the Gamma curve of other colors, which will cause the color of the gray scale to change. In this way, color shift and the white balance reversal will occur of the display panel. Referring to FIG. 1, which is an exemplary curve of the relationship between the color coordinate and the gray scale. In which, X-B is the graph before X-axis adjustment, X-A is the graph before X-axis adjustment, Y-B is the graph before Y-axis adjustment, and Y-A is the graph before Y-axis adjustment. A indicates that in 204 gray scale to 255 gray scale, the change rule of a certain color in three colors suddenly changes greatly and the Gamma curve is deflected.

Figure 2:
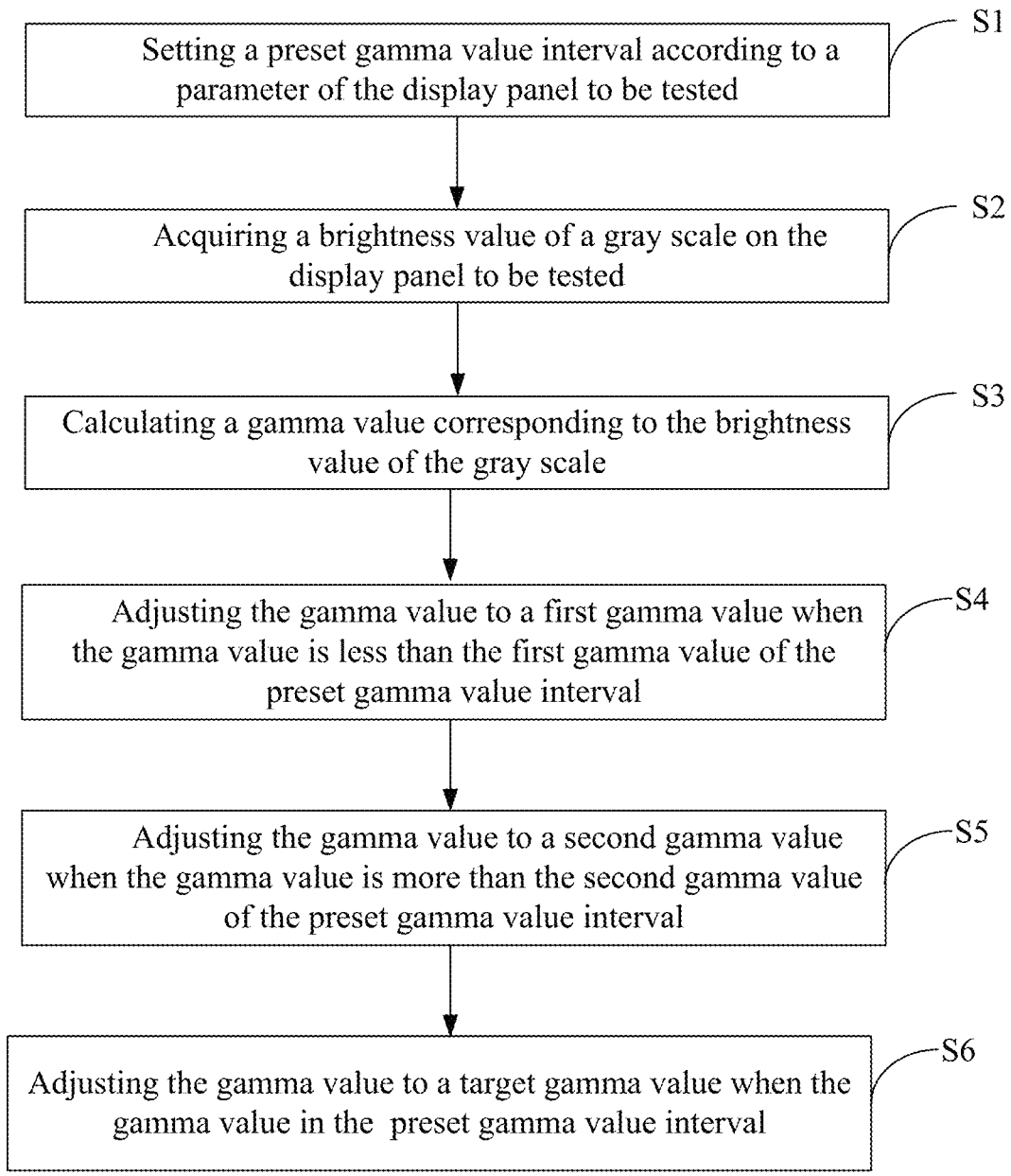
FIG. 2 is a flow chart of some embodiments of the gamma value tuning method for the display panel of the present application.

In order to solve the aforementioned problems, referring to FIG. 2, in some embodiments of the present application, the gamma value tuning method of the display panel includes the following steps:

Step S1, setting a preset gamma value interval according to a parameter of the display panel to be tested.

In the present embodiment, the parameters of the display panel to be tested can be the driving voltage, resolution or type of display panel, etc. Therefore, when setting the preset gamma value interval, it can be set according to the type of display panel to be tested. For example, the preset gamma value interval of the LCD display panel is usually set to (1.9-2.5), and when the gamma value on each gray scale is 1.9-2.5, it meets the requirements of human eyes for the linear relationship between brightness change and gray scale change.

Step S2, acquiring a brightness value of a gray scale on the display panel to be tested.

It should be noted that the input gray scale of the display panel is the gray scale that can be recognized by the display. The gray scale represents an actual objective brightness, that is, an objective physical quantity of a real object, and the display panel will continuously acquire different input voltages (also called gamma voltages), and the gray scales reflected by different input voltages are different. The output brightness is the subjective brightness feeling of human eyes. As people's perception of the stimulus in nature is non-linear, the outside world strengthens the stimulus in a certain proportion. For people, the stimulus grows evenly. Similarly, the human eye's perception of natural brightness is also non-linear, so the subjective brightness perceived by the human eye is not exactly the same as the actual objective brightness. Gamma curve is used to coordinate the mapping relationship between the human eye's subjective brightness perception and the actual objective natural brightness, that is, to coordinate the mapping relationship between the output brightness and the input gray scale, or the relationship between the two can be reflected by the formula: output brightness value=input voltage value γ. Therefore, the gamma value corresponding to each gray scale can be acquired by acquiring the brightness value of the display panel and according to the above formula correspondence.

In the present embodiment, a small number of gray scales can be selected to obtain the gray scale brightness values of the display panel to be tested as adjustment points. For example, in 8 bit 256 gray scales, the gray scales are 0 to 255, for example, 255, 254, 223, 128, 64, 31, 1 and 0 gray scales can be selected, and these points are referred to as gray scale binding points or gamma binding points, and then the brightness values of these gray scale binding points are acquired. Or from zero gray scale to the highest gray scale, the brightness value corresponding to each gray scale can be acquired, and can be specifically set according to the test requirements. In the specific implementation, after lighting the display panel to be tested, the brightness value of the panel center point of the current image can be acquired. And the brightness value corresponding to each gray scale of the display panel center point from zero gray scale to the highest gray scale can be taken as the brightness value corresponding to each gray scale of the display panel. Of course, in some other embodiments, the brightness values of each pixel point in the center point and other areas can also be acquired. The average brightness value of each pixel point can be calculated as each gray scale brightness value.

Specifically, the brightness signal corresponding to each gray scale of the display panel can be acquired by brightness acquisition equipment such as a light sensor. The brightness signal can be converted into a corresponding voltage signal. The brightness value of each gray scale of the display panel can be acquired by acquiring the voltage value of the brightness corresponding to each gray scale.

Step S3, calculating a gamma value corresponding to the brightness value of the gray scale.

In the present embodiment, the gamma value corresponding to each gray scale can be specifically calculated by a mathematical model of the brightness value and gamma value of the gray scale, and the mathematical model represents the corresponding relationship between the gamma value and the brightness value.

After calculating the brightness values corresponding to the brightness values of each gray scale, the corresponding gamma values are calculated according to the brightness values of the gray scales. A linear interpolation function is fitted according to the relationship characteristics between the gamma values corresponding to the gray scales. And then the gamma values of other gray scales are calculated according to the gammas and brightness values of the selected gray scales by the linear interpolation function. A gamma curve can be made according to the gamma value of each gray scale.

In addition, it should be noted that in some embodiments, a number of gray scales are selected as gray scales from each gray scale. The embodiments is not limited about which gray scales are specifically selected as gray scales, as long as the corresponding gamma values can be acquired from the brightness values of the gray scales and the gamma values corresponding to other gray scales can be acquired by the linear interpolation function.

Step S4, adjusting the gamma value to a first gamma value when the gamma value is less than the first gamma value of the preset gamma value interval.

In the present embodiment, after calculating the gamma value of each gray scale, the gamma value corresponding to each gray scale can be compared with the first gamma value of the preset gamma value interval, one by one from 0 gray scale to the highest gray scale. When the gamma value of the gray scale is less than the first gamma value of the preset gamma value interval, the gamma value of the gray scale is adjusted to the first gamma value until the gamma adjustment of the highest-order gray scale is completed. Alternatively, the gammas corresponding to the selected gray scales are respectively compared with the first gamma value of the preset gamma value interval. When the gamma value corresponding to the selected gray scales are smaller than the first gammas of the preset gamma value interval, the gamma value of the gray scales are adjusted to the first gamma value. Then the linear interpolation function is adopted to adjust the gamma value corresponding to other unselected gray scales by adjusting the gamma values of the adjusted gray scales.

In the present embodiment, in the preset gamma value interval, the first gamma value can be set to the minimum gamma value of the interval, i.e. 1.9. The target gamma value can be set to 2.2. The second gamma value may set the maximum value of the interval, i.e. 2.5. It will be understood that the first gamma value and the second gamma value may also be set to other values. For example, the first gamma value is set to 2.1 and the second gamma value is set to 2.3, which is not limited herein.

In step S5, when the gamma value corresponding to the gray scale is less than the first gamma value 1.9, for example, the gamma value corresponding to the 131 gray scale is 1.8, and the gamma value corresponding to the 131 gray scale is less than the first gamma value 1.9. The gamma value of the gray scale is adjusted to 1.9, although in other embodiments, the preset gamma value range may be (2.1-2.3) without limitation herein.

Step S6, adjusting the gamma value to a second gamma value when the second gamma value in the gamma value is larger than the preset gamma value interval.

In some embodiments, after calculating the gamma value of each gray scale, the gamma value corresponding to each gray scale can be compared with the second gamma value of the preset gamma value interval, one by one from 0 gray scale to the highest gray scale. When the gamma value of the gray scale is more than the first gamma value of the preset gamma value interval, the gamma value of the gray scale is adjusted to the second gamma value until the gamma adjustment of the highest-order gray scale is completed. Alternatively, the gammas corresponding to the selected gray scales are respectively compared with the second gamma value of the preset gamma value interval. When the gamma value corresponding to the selected gray scales are larger than the second gammas of the preset gamma value interval, the gamma value of the gray scales are adjusted to the second gamma value. Then the linear interpolation function is adopted to adjust the gamma value corresponding to other unselected gray scales by adjusting the gamma values of the adjusted gray scales.

Figure 4:
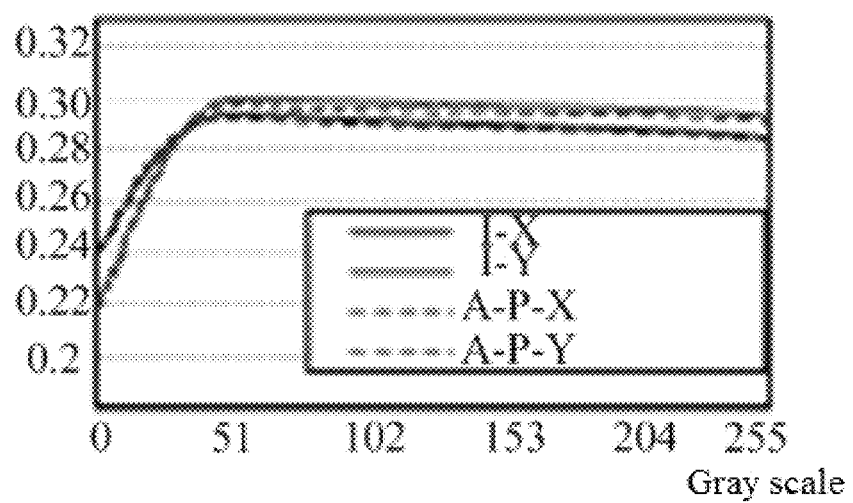
FIG. 4 is a graph showing the relationship between color coordinates and gray scales of the present application.

In the present embodiment, the preset gamma value interval is (1.9-2.5), and the second gamma value in the interval may be set to 2.5. When the gamma value corresponding to the gray scale is larger than the second gamma value 2.5, for example, the gamma value corresponding to the 128 gray scale is 3.0. When the gamma value corresponding to the 128 gray scale is larger than the second gamma value 2.5, the gamma value of the gray scale is adjusted to 2.5. Referring to FIG. 4, which is a curve showing the relationship between the color coordinate and the gray scale of the present application. In which, I-X is the graph before X-axis adjustment, A-P-X is the graph after X-axis adjustment, I-Y is the graph before Y-axis adjustment, and A-P-Y is the graph after Y-axis adjustment. By adopting the gamma value tuning method of the display panel, the color shift of the display panel is improved, thereby improving the display quality of the display panel.

The gamma value tuning method of the display panel of the present application calculates the gamma value of each gray scale after acquiring the brightness value of each gray scale of the display panel to be tested. The gamma value corresponding to the gray scale is then adjusted to the first gamma value when each gamma value in the preset gamma value interval is determined smaller than the first gamma value, or the gamma value corresponding to the gray scale is adjusted to a second gamma value, when each gamma value in the preset gamma value interval is determined larger than the second gamma value. So the gamma value of each gray scale meets the linear relationship between brightness change and gray scale change required by human eyes, and the difference has been reduced between the gamma value corresponding to each gray scale and the target gamma value. The present application solves the problem of the color shift and the white balance reversal when the difference between the gamma value corresponding to the gray scale and the target gamma value is too large during the adjustment of the gamma, thereby improving the display picture quality of the display panel.

In some embodiments, the step of calculating a gamma value corresponding to the brightness value of the gray scale specifically includes:

calculating the gamma value $\gamma$ corresponding to the brightness value of the gray scale according to a first preset formula $$\gamma = \log_{\frac{n}{M}} \left[ \frac{Lv\ (n) - Lv\ (0)}{Lv\ (M) - Lv\ (0)} \right],$$

in which, Lv(n) is an n-order gray scale brightness value, Lv(0) is a zero-order gray scale brightness value, Lv(M) is a highest-order gray scale brightness value, and n is an integer greater than 0 and less than M. In which, M is the number of gray scales of the display panel, for example, in 8 bit 256 gray scales, M is 256.

In some embodiments, the relationship between the brightness values of each gray scale and the gammas of the corresponding gray scale follows:

$$\left[ \frac{Lv\ (n) - Lv\ (0)}{Lv\ (M) - Lv\ (0)} \right] = \left( \frac{n}{M} \right)^{\gamma}. \qquad (1)$$

The first preset formula can be acquired after taking the logarithm of both sides of the equation in formula (1). According to the first preset formula, the gamma value of the gray scale can be calculated by acquiring the zero-order brightness value, the highest-order brightness value and the brightness value of the gray scale. After comparing the gamma value of the gray scale with the minimum value and the second value of the preset gamma value interval, it is judged whether the gamma value needs to be adjusted.

In some embodiments, the step of adjusting the gamma value to a first gamma value specifically includes:

adjusting the brightness value corresponding to the gamma value to the brightness value Lv(n) corresponding to the first gamma, according to the second preset formula $$Lv\ (n1) = [Lv\ (M) - Lv\ (0)] * \left( \frac{n}{M} \right)^{\gamma} + Lv\ (0),$$

in which, Lv(0) is a zero-order gray scale brightness value, Lv(M) is a highest-order gray scale brightness value, and n is an integer greater than zero and less than M.

In the present embodiment, after determining that the gray scale with the gamma value smaller than the second value 1.9 in the preset interval (1.9-2.5) is the gray scale to be adjusted, the brightness value of the gray scale is adjusted to the brightness value corresponding to the first gamma value 1.9 through the second preset formula. Specifically, according to the gray scale brightness value corresponding to the gray scale on the gamma 1.9 curve, the gray scale, the brightness value corresponding to the gray scale is adjusted by an iterative process of successively approaching the gray scale brightness value, so that the gray scale brightness value of the gray scale to be adjusted reaches the gray scale brightness value on the gamma 1.9 curve.

In some embodiments, the step of adjusting the gamma value to a second gamma value specifically includes:

adjusting the brightness value corresponding to the gamma value to the brightness value Lv(n) corresponding to the second gamma value, according to the second preset formula $$Lv\ (n2) = [Lv\ (M) - Lv\ (0)] * \left( \frac{n}{M} \right)^{\gamma} + Lv\ (0),$$

in which, Lv(0) is a zero-order gray scale brightness value, Lv(M) is a highest-order gray scale brightness value, and n is an integer greater than zero and less than M.

In the present embodiment, after determining that the gray scale with the gamma value larger than the second value 2.5 in the preset interval (1.9-2.5) is the gray scale to be adjusted, the brightness value of the gray scale is adjusted to the brightness value corresponding to the second gamma value 2.5 through the second preset formula. Specifically, according to the gray scale brightness value corresponding to the gray scale on the gamma 2.5 curve, the gray scale, the brightness value corresponding to the gray scale is adjusted by an iterative process of successively approaching the gray scale brightness value, so that the gray scale brightness value of the gray scale to be adjusted reaches the gray scale brightness value on the gamma 2.5 curve.

In the aforementioned embodiments, after calculating the gamma value corresponding to the brightness value of the gray scale, the first reference Gamma curve can be made with the second gamma value, and the second reference Gamma curve can be made with the first gamma value. The gray scale to be tuned can be found out according to the first reference Gamma curve and the second reference Gamma curve, and then the gray scale to be tuned can be tuned according to the target gray scale brightness value corresponding to the gray scale in the first reference Gamma curve and the second reference Gamma curve. So the gray scale brightness value of the gray scale to be tuned can reach the brightness value on the Gamma curve corresponding to the gray scale, relative to the existing gamma value adjustment, the embodiments of the present application can effectively avoid the adjustment of the gray scale brightness values which meets the requirements, and corrects the gray scale brightness values only for individual gray scales at a time, avoids a large number of repeated operations, improves the working efficiency of gamma adjustment, ensures the accuracy of gamma adjustment at the same time, and meets the demand of batch production.

Specifically, the brightness adjusting values corresponding to each gamma value are added to the brightness values corresponding to each gamma value, so as to adjust the brightness values corresponding to each gamma value to the brightness values corresponding to the first gamma value. Or, the brightness adjusting values corresponding to each gamma value are added to the brightness values corresponding to each gamma value, so as to adjust the brightness values corresponding to each gamma value to the brightness values corresponding to the second gamma value.

Figure 3:
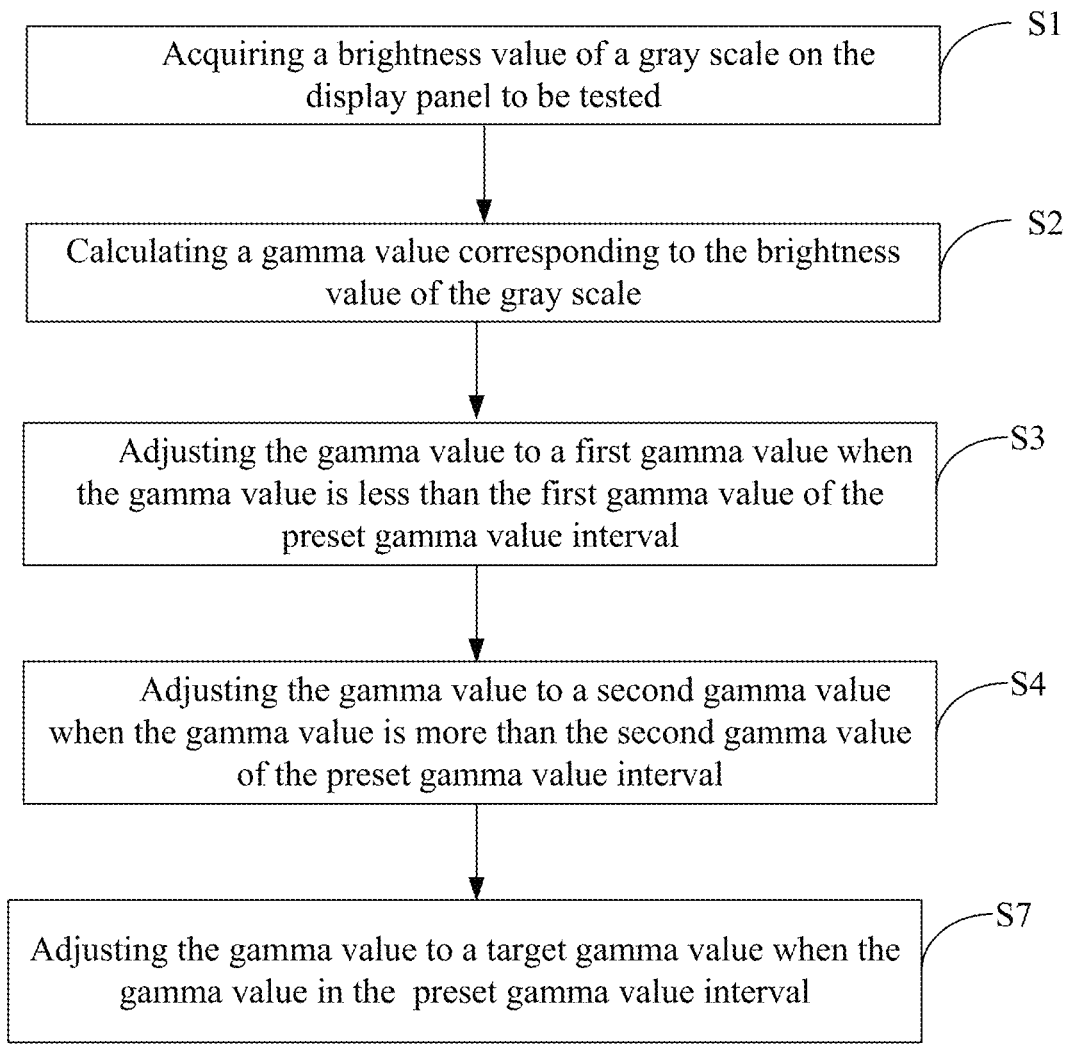
FIG. 3 is a flow chart of some other embodiments of the gamma value tuning method for the display panel of the present application.

Referring to FIG. 3, in some optional embodiments, the gamma value tuning method of the display panel further comprises the following steps:

Step S7: adjusting the gamma value to a target gamma value, when the gamma value is within the preset gamma value interval.

It should be noted that when the gamma value on each gray scale is between 1.9 and 2.5, it meets the requirements of human eyes for the linear relationship between brightness change and gray scale change. And the median value of 2.2 is generally taken as the target value in the display panel to debug the Gamma curve. When the gamma value of the gray scale is in the interval (1.9-2.5), for example, the gamma value corresponding to the 191 gray scale is 2.1. When the gamma value corresponding to the 191 gray scale is in the interval (1.9-2.5), the gamma value of the gray scale is adjusted to the target gamma value 2.2.

In some embodiments, the step of adjusting each of the gamma values to the target gamma value specifically includes:

adjusting the brightness value corresponding to the gamma value to the brightness value Lv(n) corresponding to the target gamma, according to the second preset formula $$Lv\ (n3) = [Lv\ (M) - Lv\ (0)] * \left(\frac{n}{M}\right)^{\gamma} + Lv\ (0),$$

in which, Lv(0) is a zero-order gray scale brightness value, Lv(M) is a highest-order gray scale brightness value, and n is an integer greater than zero and less than M.

In the present embodiment, after calculating the gamma value corresponding to the brightness value of the gray scale, the target Gamma curve can also be made with the target gamma value, then the gray scale to be tuned with the gamma value in the range of 1.9-2.5 is found according to the target gamma, and then the gray scale to be tuned is tuned according to the target gray scale brightness value corresponding to the gray scale. So the gray scale brightness value of the gray scale can be tuned and reaches the brightness value on the Gamma curve corresponding to the gray scale. Relative to the existing gamma value adjustment, the embodiments of the present application can effectively avoid the adjustment of the gray scale brightness values which meets the requirements, and corrects the gray scale brightness values only for individual gray scales at a time, avoids a large number of repeated operations, improves the working efficiency of gamma adjustment, ensures the accuracy of gamma adjustment at the same time, and meets the demand of batch production.

Referring to FIGS. 2 and 3, in the above embodiments, the step of adjusting the brightness value corresponding to each of the gamma value to the brightness value Lv(n) corresponding to the target gamma value includes: adjusting the gamma voltage corresponding to the brightness value to adjust the brightness value of the gray scale to the target brightness value.

It should be noted that display panel is mostly digitally driven. In order to achieve a linear relationship between the number of digitized gray scales and the change of brightness perceived by human eyes, a Gamma curve is fitted according to the voltage-transmittance curve of the display panel. The transmittance can be acquired by dividing the brightness value corresponding to the gray scale by the brightness value corresponding to the second gray scale. And the gamma voltage and transmittance data corresponding to each gray scale are fitted to obtain the V-T curve lit by the display panel at that pixel. Therefore, adjusting the gamma voltage can be implemented by adjusting the corresponding gray scale, and the brightness value on the gray scale can be adjusted.

Specifically, it can be realized by changing the voltage output by the Data (Data Drive) IC in the display panel to convert the digital picture pixel data to be displayed into voltage signals on both sides of the input value liquid crystal. The way of generating gamma voltage can be realized by partial voltage of the gamma value resistor string in the gamma generation circuit and adjusting the voltage of the gamma value resistor string to realize gamma adjustment. The way of generating gamma voltage can also be realized by programmable gamma value devices. As such, the brightness display of the display panel under different gray scales is uniform. The brightness value of the center point of the display panel is tested, and the gamma voltage is adjusted by using this brightness value.

The present application further provides a gamma value tuning method of the display panel.

Figure 5:
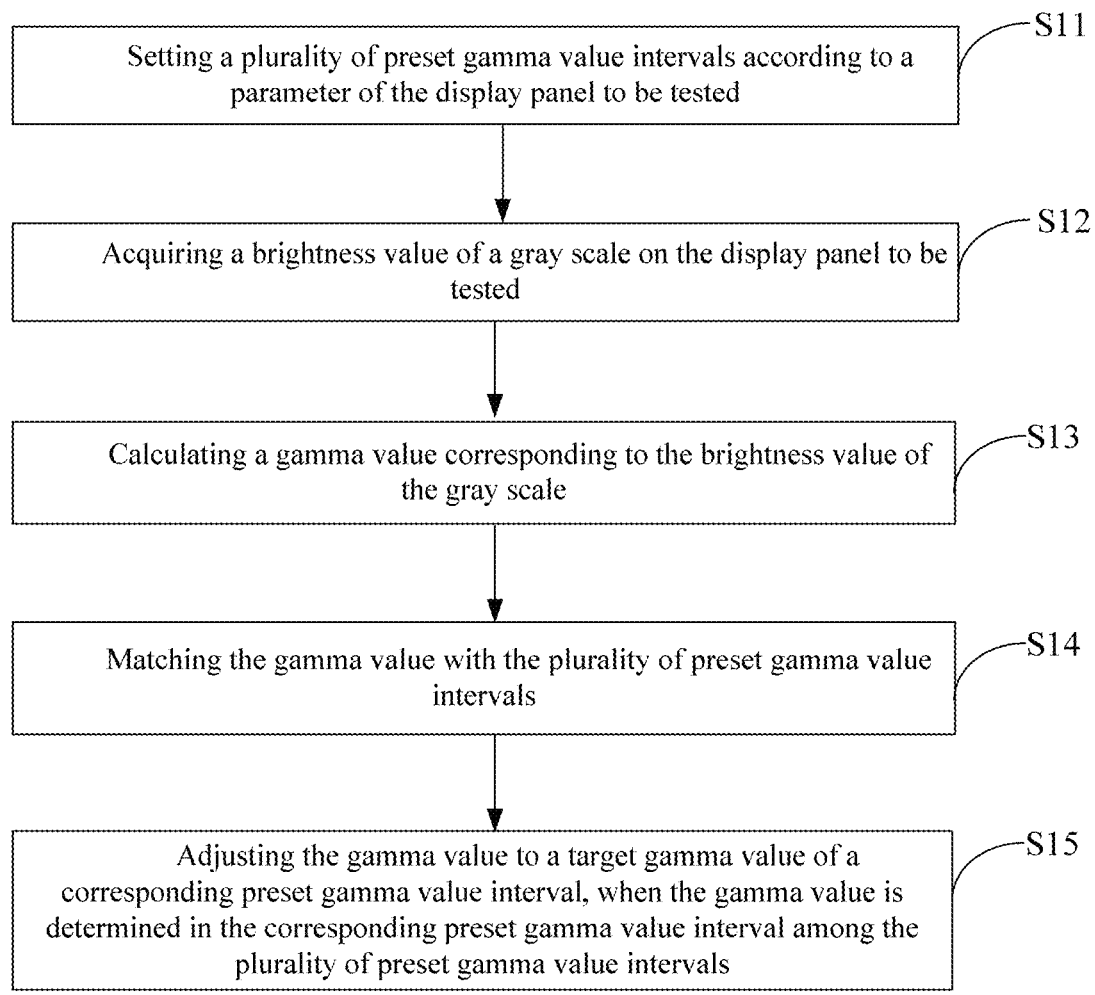
FIG. 5 is a flow chart of some other embodiments of the gamma value tuning method for the display panel of the present application.

Referring to FIG. 5, in some other embodiments of the present application, the gamma value tuning method of the display panel includes the following steps:

Step S11, setting a plurality of preset gamma value intervals according to a parameter of the display panel to be tested;

Step S12, acquiring a brightness value of a gray scale on the display panel to be tested;

Step S13, calculating a gamma value corresponding to the brightness value of the gray scale;

Step S14, matching the gamma value with the plurality of preset gamma value intervals;

Step S15, adjusting the gamma value to a target gamma value of a corresponding preset gamma value interval, when the gamma value is determined in the corresponding preset gamma value interval among the plurality of preset gamma value intervals.

In the present embodiment, the parameters of the display panel to be tested may be the driving voltage, resolution, type of display panel, etc. Therefore, when setting the preset gamma value intervals, the number of the plurality of preset gamma value intervals may be five, can respectively be less than 1.9, (1.9-2.2), (2.2-2.5), (2.5-2.8), and greater than 2.8. After calculating the gamma value corresponding to the brightness value of the gray scale, the gamma value is matched with the plurality of preset gamma value intervals. For example, when the calculated gamma value is less than 1.9, the gamma value is adjusted to 1.9, where 1.9 is the target gamma value of the interval less than 1.9. Or, when the calculated gamma value is in the range of (2.2-2.5), the gamma value can be adjusted to 2.2, where 2.2 is the target gamma value in the range of (2.2-2.5). Of course, when the gamma value is in the range of (1.9-2.2) or (2.2-2.5), the target gamma value can take the mid-range value of 1.9 or 2.2 or 2.5, in some embodiments, it can be selected as 2.2 or, of course, it can also be the set value in the range. No limitation is given herein.

According to the gamma value tuning method of the display panel, a plurality of preset gamma value intervals are set according to the parameters of the display panel to be tested. After acquiring the brightness values of each gray scale of the display panel to be tested, the gamma value of each gray scale is calculated. Then the gamma value is matched with a plurality of preset gamma value intervals. The gamma value is adjusted to a target gamma value of the corresponding preset gamma value interval when the gamma value is determined to be in the corresponding preset gamma value interval among the plurality of preset gamma value intervals. So the difference has been reduced between the gamma value corresponding to each gray scale and the target gamma value under the condition that the gamma value of each gray scale meets the requirements of human eyes on the linear relationship between brightness change and gray scale change. The present application solves the problem of the color shift and the white balance reversal when the difference between the gamma value corresponding to the gray scale and the target gamma value is too large during the adjustment of the gamma, thereby improving the display picture quality of the display panel.

The present application also provides a gamma value tuning device of a display panel.

Figure 6:
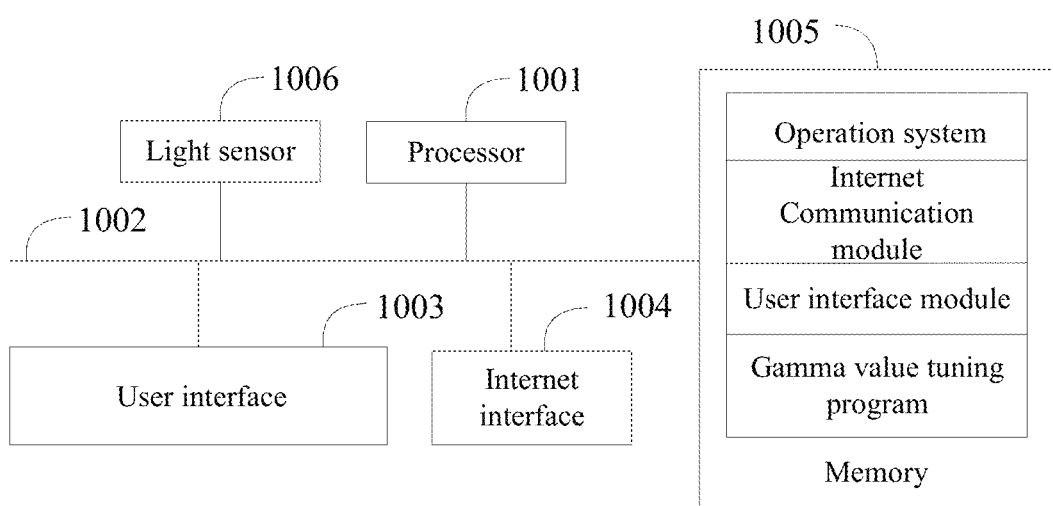
FIG. 6 is a terminal structural schematic diagram of the hardware operating environment of the gamma value tuning device of the display panel involved in some embodiments of the present application.

Referring to FIG. 6, the gamma value tuning device includes a light sensor 1006, a processor 1001, a memory 1005, and a gamma value tuning program stored on the memory 1005 and executable on the processor 1001. The light sensor 1006 is configured to acquire the brightness value of the gray scale on the display panel 1007 to be tested.

The processor 1001 is configured to run a gamma value tuning program.

The memory 1005 is configured to store a gamma value tuning program executable on the processor 1001.

The light sensor 1006 is electrically connected to the processor 1001, and when the gamma value tuning program is executed by the processor, the step of tuning the display panel gamma value device as described above is implemented.

In which, the method implemented when the gamma value tuning method program is executed may refer to the embodiments of the gamma value tuning method of the display panel of the present application, and will not be described herein.

Referring to FIG. 6, which is a terminal structural schematic diagram of the hardware operating environment of the gamma value tuning device of the display panel involved in some embodiments of the present application.

The terminal of the embodiment of the present application may be a PC, or may be a portable terminal device with display function such as a smartphone, a tablet computer, an e-book reader, an Moving Picture Experts Group Audio Layer IV (MP4) player, a portable computer, etc. As shown in FIG. 1, the terminal may include a processor 1001 (e.g., CPU), a communication bus 1002, a user interface 1003, a network interface 1004, a memory 1005, and an optical sensor 1006. The communication bus 1002 is configured to realize communication between these components. The communication bus may be a UART bus or an I2C bus. The user interface 1003 may include a display panel, an input unit such as a keyboard. The network interface 1004 may optionally include a standard wired interface, a wireless interface (such as a Wi-Fi interface). The memory 1005 may be a high-speed RAM memory or a non-volatile memory such as a magnetic disk memory, and the memory 1005 may optionally be a storage device independent of the aforementioned processor 1001. The light sensor 1006 is electrically connected to the processor 1001 through the communication bus 1002.

Figure 7:
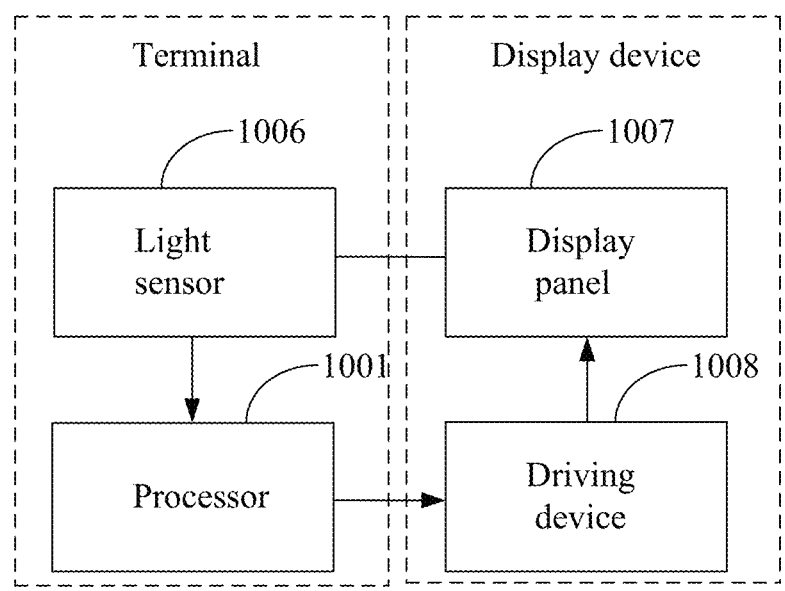
FIG. 7 is a structural schematic diagram of the terminal applied to tuning the gamma value of the display panel of the present application.

Referring to FIGS. 6 and 7, FIG. 7 is a structural schematic diagram of the terminal applied to tuning the gamma value of the display panel of the present application. The display device generally includes a display panel 1007 and a driving device 1008 for driving the display panel 1007 to work. The processor can also be electrically connected to the driving device 1008 through the communication bus 1002, and the processor 1001 outputs an image display signal to the driving device 1008 so that the driving device 1008 can drive the display panel 1007 to work and finish the gamma value tuning of the display panel 1007.

It will be understood that the terminal structure of the hardware operating environment of the gamma value tuning device shown in FIG. 6 does not constitute a limitation on the gamma value tuning device of the display panel of the present application, and may include more or fewer components than shown, or some components may be combined, or different component arrangements may be provided.

The present application further provides a computer-readable storage medium having stored thereon a gamma value tuning program which, when executed by a processor, implements the steps of the gamma value tuning method of the display panel as described above.

Referring to FIG. 6 again, the memory 1005 in FIG. 6 as a computer storage medium may include an operating system, a network communication module, a user interface module, and a gamma value tuning program.

In the terminal shown in FIG. 6, the network interface 1004 is mainly configured to connect the cloud server and communicate data with the cloud server. The network interface 1004 is also configured to connect to a platform for providing anti-drop goods, which includes general function modules for providing various service functions. The user interface 1003 can connect the client (user end) and communicate data with the client. The processor 1001 may be configured to invoke the gamma value tuning program stored in the memory 1005 and perform the tuning steps of the gamma value tuning method described aforementioned.

In which, the method implemented when the gamma value tuning method program is executed may refer to the embodiments of the gamma value tuning method of the display panel of the present application, and will not be described herein.

From the description of the above embodiments, it will be clear to those skilled in the art that the method of the above embodiments can be implemented by means of software plus the necessary general hardware platform, although it can also be implemented by hardware, but in many cases the former is a better embodiment. Based on this understanding, the technical solution of the present application, in essence, or the part contributing to the prior art, can be embodied in the form of a software product stored in a storage medium (such as ROM/RAM, magnetic disk, diskette) as described above, including several instructions to cause a terminal device (which can be a mobile phone, computer, server, or network device, etc.) to perform the methods described in various embodiments of the present application.

This is only some embodiments of the present application and is not intended to limit the scope of the present application. Any equivalent structural change made under the concept of the present application using the contents of the present application specification and drawings, or directly/indirectly applied in other related technical fields, shall be included in the protection scope of the present application.

What is claimed is:

1. An automated gamma value tuning method of a display panel, wherein, the gamma value tuning method comprises the following operations:
   setting a preset gamma value interval according to a parameter of the display panel to be tested;
   acquiring a brightness value of a gray scale on the display panel to be tested;
   calculating a gamma value corresponding to the brightness value of the gray scale;
   adjusting the gamma value to a first gamma value when the gamma value is less than the first gamma value in the preset gamma value interval; and
   adjusting the gamma value to a second gamma value when the gamma value is larger than the second gamma value in the preset gamma value interval;
   wherein, the operation of calculating a gamma value corresponding to the brightness value of the gray scale comprises:
   calculating the gamma value corresponding to the brightness value of the gray scale according to a first preset formula $$\gamma = \log_{\left(\frac{n}{M}\right)}\left[\frac{Lv(n) - Lv(0)}{Lv(M) - Lv(0)}\right],$$

wherein, Lv(n) is an n-order gray scale brightness value, Lv(0) is a zero-order gray scale brightness value, Lv(M) is a highest-order gray scale brightness value, and n is an integer greater than zero and less than M.

2. The automated gamma value tuning method of claim 1, wherein the operation of adjusting the gamma value to a first gamma value comprises:
   adjusting the brightness value corresponding to the gamma value to the brightness value Lv(n2) corresponding to the first gamma, according to a second preset formula $$Lv(n2) = [Lv(M) - Lv(0)]*\left(\frac{n}{M}\right)^\gamma + Lv(0),$$

wherein, Lv(0) is a zero-order gray scale brightness value, Lv(M) is a highest-order gray scale brightness value, and n is an integer greater than zero and less than M.

3. The automated gamma value tuning method of claim 2, wherein, the operation of adjusting the brightness value corresponding to the gamma value to the brightness value Lv(n2) corresponding to the first gamma value comprises:
   adding a self-corresponding brightness adjusting value on the basis of the brightness value corresponding to the gamma value, to adjust the brightness value corresponding to each gamma value to the brightness value corresponding to the first gamma value.

4. The automated gamma value tuning method of claim 3, wherein, the operation of adjusting the brightness value corresponding to each gamma value to the brightness value corresponding to the first gamma value comprises:
   adjusting a gamma voltage corresponding to the brightness value, to adjust the brightness value of the gray scale to a first brightness value.

5. The automated gamma value tuning method of claim 1, wherein, the operation of adjusting the gamma value to the second gamma value comprises:
   adjusting the brightness value corresponding to the gamma value to the brightness value Lv(n1) corresponding to the second gamma, according to the second preset formula $$Lv(n1) = [Lv(M) - Lv(0)]*\left(\frac{n}{M}\right)^\gamma + Lv(0),$$

wherein, Lv(0) is a zero-order gray scale brightness value, Lv(M) is a highest-order gray scale brightness value, and n is an integer greater than zero and less than M.

6. The automated gamma value tuning method of claim 5, wherein, the operation of adjusting the brightness value corresponding to the gamma value to the brightness value Lv(n2) corresponding to the second gamma value comprises:
   reducing the brightness adjusting value on the basis of the brightness value corresponding to the gamma value, to adjust the brightness value corresponding to the gamma value to the brightness value corresponding to the second gamma value.

7. The automated gamma value tuning method according to claim 6, wherein the operation of adjusting the brightness value corresponding to each gamma value to the brightness value corresponding to the second gamma value comprises:
   adjusting a gamma voltage corresponding to the brightness value, to adjust the brightness value of the gray scale to a second brightness value.

8. The automated gamma value tuning method of claim 1, wherein, the gamma value tuning method further comprises the following operation:
   adjusting the gamma value to a target gamma value, when the gamma value is within the preset gamma value interval.

9. The automated gamma value tuning method according to claim 8, wherein, the operation of adjusting the gamma value to a target gamma value comprises:
   adjusting the brightness value corresponding to the gamma value to the brightness value Lv(n) corresponding to the target gamma, according to the second preset formula $$Lv(n) = [Lv(M) - Lv(0)]*\left(\frac{n}{M}\right)^\gamma + Lv(0),$$

wherein, Lv(0) is a zero-order gray scale brightness value, Lv(M) is a highest-order gray scale brightness value, and n is an integer greater than zero and less than M.

10. The automated gamma value tuning method of claim 9, wherein, the operation of adjusting the brightness value corresponding to the gamma value to the brightness value Lv(n) corresponding to the target gamma value comprises:
   increasing or decreasing respectively the brightness adjusting value based on the brightness value corresponding to the gamma value, to adjust the brightness value corresponding to the gamma value to the brightness value corresponding to the target gamma value.

11. The automated gamma value tuning method according to claim 10, wherein, the operation of adjusting the brightness value corresponding to the gamma value to the brightness value corresponding to the target gamma value comprises:
adjusting a gamma voltage corresponding to the brightness value to adjust the brightness value of the gray scale to a target brightness value.

12. The automated gamma value tuning method of claim 8, wherein, the first gamma value is the minimum gamma value in the preset gamma value interval; and the second gamma value is the maximum gamma value in the preset gamma value interval.

13. The automated gamma value tuning method of claim 12, wherein, the target gamma value is 2.2; the minimum gamma value is 1.9; the maximum gamma value is 2.5.

14. An automated gamma value tuning device of a display panel, wherein, the gamma value tuning device comprises:
a light sensor, configured to acquire a brightness value of a gray scale on the display panel to be tested;
a processor, configured to run a gamma value tuning program; and
a memory, configured to store a gamma value tuning program executable on the processor; wherein,
the light sensor is electrically connected to the processor, the gamma value tuning program is executed by the processor to implement the operations;
the gamma value tuning program is executed by the processor to implement the operations comprising:
setting a preset gamma value interval according to a parameter of the display panel to be tested;
acquiring a brightness value of a gray scale on the display panel to be tested;
calculating a gamma value corresponding to the brightness value of the gray scale;
adjusting the gamma value to a first gamma value when the gamma value is less than the first gamma value of the preset gamma value interval; and
adjusting the gamma value to a second gamma value when the second gamma value in the gamma value is larger than the preset gamma value interval; wherein, the gamma value corresponding to the brightness value of the gray scale is calculated according to a first preset formula $$\gamma = \log_{\left(\frac{n}{M}\right)} \left[ \frac{Lv(n) - Lv(0)}{Lv(M) - Lv(0)} \right],$$

wherein, Lv(n) is an n-order gray scale brightness value, Lv(0) is a zero-order gray scale brightness value, Lv(M) is a highest-order gray scale brightness value, and n is an integer greater than zero and less than M.

15. The automated gamma value tuning device of claim 14, wherein, the gamma value tuning program is executed by the processor to implement the operations comprising:
adjusting the gamma value to a target gamma, when the gamma value is within the preset gamma value interval.

16. The automated gamma value tuning device of claim 14, the gamma value tuning program is executed by the processor to implement the operations comprising:
adjusting the brightness value corresponding to the gamma value to the brightness value Lv(n2) corresponding to the first gamma, according to a second preset formula $$Lv(n2) = [Lv(M) - Lv(0)] * \left(\frac{n}{M}\right)^{\gamma} + Lv(0),$$

wherein, Lv(0) is a zero-order gray scale brightness value, Lv(M) is a highest-order gray scale brightness value, and n is an integer greater than zero and less than M.

17. The automated gamma value tuning device of claim 14, wherein, the gamma value tuning program is executed by the processor to implement the operations comprising:
adjusting the brightness value corresponding to the gamma value to the brightness value Lv(n1) corresponding to the second gamma value, according to a second preset formula $$Lv(n1) = [Lv(M) - Lv(0)] * \left(\frac{n}{M}\right)^{\gamma} + Lv(0),$$

wherein, Lv(0) is a zero-order gray scale brightness value, Lv(M) is a highest-order gray scale brightness value, and n is an integer greater than zero and less than M.

18. An automated gamma value tuning method of a display panel, wherein, the gamma value tuning method comprises the following operations:
setting a plurality of preset gamma value intervals according to a parameter of the display panel to be tested;
acquiring a brightness value of a gray scale on the display panel to be tested;
calculating a gamma value corresponding to the brightness value of the gray scale;
matching the gamma value with the plurality of preset gamma value intervals; and
adjusting the gamma value to a target gamma value of a corresponding preset gamma value interval, when the gamma value is determined in the corresponding preset gamma value interval among the plurality of preset gamma value intervals;
wherein, the gamma value corresponding to the brightness value of the gray scale is calculated according to a first preset formula $$\gamma = \log_{\left(\frac{n}{M}\right)} \left[ \frac{Lv(n) - Lv(0)}{Lv(M) - Lv(0)} \right],$$

wherein, Lv(n) is an n-order gray scale brightness value, Lv(0) is a zero-order gray scale brightness value, Lv(M) is a highest-order gray scale brightness value, and n is an integer greater than zero and less than M.

* * * * *